United States Patent [19]

Kiya et al.

[11] Patent Number: 4,714,999
[45] Date of Patent: Dec. 22, 1987

[54] NUMERICAL CONTROL METHOD

[75] Inventors: Nobuyuki Kiya, Hachioji; Motoaki Yoshino, Suginami, both of Japan

[73] Assignee: Fanuc Ltd., Minamitsuru, Japan

[21] Appl. No.: 744,009

[22] PCT Filed: Jan. 26, 1985

[86] PCT No.: PCT/JP85/00033

§ 371 Date: May 31, 1985

§ 102(e) Date: May 31, 1985

[87] PCT Pub. No.: WO85/03365

PCT Pub. Date: Aug. 1, 1985

[30] Foreign Application Priority Data

Jan. 26, 1984 [JP] Japan .................................. 59-012429

[51] Int. Cl.$^4$ ...................... G06F 15/46; G05B 19/18
[52] U.S. Cl. .................................. 364/474; 364/475; 364/167
[58] Field of Search ............... 364/167, 170, 171, 184, 364/474, 475, 513, 188, 191, 474, 37, 38, 24; 318/563, 565

[56] References Cited

U.S. PATENT DOCUMENTS

| | | | |
|---|---|---|---|
| 4,045,660 | 8/1977 | Weisgerber et al. | 364/474 |
| 4,370,705 | 1/1983 | Imazeki et al. | 364/184 |
| 4,442,493 | 4/1984 | Wakai et al. | 364/475 |
| 4,484,287 | 11/1984 | Gamo et al. | 364/170 X |
| 4,513,380 | 4/1985 | Spooner | 364/474 |
| 4,521,847 | 6/1985 | Ziehm et al. | 364/184 |
| 4,536,849 | 8/1985 | Borisch et al. | 364/184 X |
| 4,575,791 | 3/1986 | Schwefel | 364/171 |
| 4,597,040 | 6/1986 | Buizer | 364/474 |

Primary Examiner—Michael R. Fleming
Attorney, Agent, or Firm—Staas & Halsey

[57] ABSTRACT

A numerical control method for a numerical control system having a numerical control unit (NC) for numerically controlling a machine tool or the like, as well as a programmable controller unit (PC), wherein when machining is suspended and then resumed, the NC unit (1) runs the machining program from the beginning of the machining program up to a prescribed block at which machining is to be resumed, without peforming a distribution operation. During running of the program, data regarding M-, S- and T-functions in the machining program are successively delivered to and stored in the PC unit (2). At this time the PC unit (2) does not send these data to the machine side. Machining is resumed at the conclusion of a search operation up to the prescribed block. However, since the M-, S- and T-functions have already been set automatically in the PC unit (2) to conditions exactly the same as those that prevailed at the suspension of machining, the machining operation can be resumed smoothly from the instant of machining resumption.

4 Claims, 3 Drawing Figures

NUMERICAL CONTROL METHOD

BACKGROUND OF THE INVENTION

1. Field of the Invention

This invention relates to a numerical control method and, more particularly, to a numerical control method wherein operation is simple at resumption of machining.

2. Description of the Related Art

If, during the machining of a workpiece by a machine tool controlled by a numerical control unit, a tool should break or a power failure occur and result in suspension of the machining operation, the conventional practice is to take the following countermeasures and then resume machining:

(1) The numerical control unit stores, in advance, a machining resumption starting point. For example, the starting point is set in a digital switch or stored in a non-volatile memory.

(2) To resume machining, the operator manipulates an NC operator's panel to restore a table or tool to the machine origin.

(3) After restoration to the origin is performed, the operator positions the table or tool at the machining starting point by using machining starting point information stored in the non-volatile memory or set on the digital switch.

(4) After positioning at the machining starting point is performed, the operator returns numerical control command data to the beginning.

(5) The operator then causes the numerical control unit to search a program from the beginning of the numerical control command data to the position at which machining was suspended. At this time, M-, S- and T-function instructions are not delivered to a programmable controller unit (PC) and these functions are not performed on the PC or machine side.

(6) After (5) is carried out, the operator observes the M-, S- and T-function data that prevailed at the suspension of machining, which data are displayed on a display of the numerical control unit, manually sets the observed data in the PC and resumes machining.

Thus, at the resumption of machining, the conventional numerical control unit is caused to search the program from the beginning of the numerical control command data to the position at which machining was suspended. In doing so, however, the numerical control unit does not perform a distribution operation. Since arithmetic functions are suspended on the PC side, the PC does not have knowledge concerning the M-, S- and T-function data that prevailed at suspension of machining. Consequently, when the program arrives at the state for resumption of machining, the states of the M-, S- and T-functions are displayed on the display unit and these are set in the PC while being verified visually by the operator. Thus, in resuming machining, operator intervention is a necessity in the prior art. This not only results in a troublesome machining restart operation, but is also inconvenient in that unexpected accidents occur when the operator mistakes the states of the M-, S- and T-functions and erroneously enters them in the PC.

SUMMARY OF THE INVENTION

An object of the present invention is to provide a numerical control method whereby, when machining is suspended and then resumed, execution is restarted from any block of a machining program and machining is continued under conditions exactly the same as those that prevailed when the program was run from the beginning, this being accomplished in a short period of time and without requiring much skill.

Another object of the present invention is to provide a numerical control method whereby machining is capable of being resumed without manually inputting the states of M-, S- and T-functions in a PC.

According to the present invention, there is provided a numerical control method for a numerical control system including a numerical control unit for executing numerical control of a machine on the basis of a machining program and a programmable controller unit for executing sequence control of a machine on the basis of a control signal from the numerical control unit. The method has a first step of returning the machining program to the beginning when automatic operation of the numerical control unit is suspended and a second step of running the machining program up to a prescribed position necessary for resuming machining, this being executed by the numerical control unit after the first step. A third step is included and involves operating the programmable controller unit based on data transmitted by the numerical control unit without the programmable controller unit outputting signals to the machine side, this being executed when the second step is executed. A fourth step is also included and involves resuming machining after the numerical control unit runs the machining program up to the prescribed position necessary for resuming machining.

By providing the numerical control method of the present invention, when machining is resumed following restoration after suspension of machining caused by breakage of a tool or a power failure, it is possible for machining to be resumed under exactly the same conditions that prevailed at suspension.

DESCRIPTION OF THE PREFERRED EMBODIMENTS

To explain the present invention in greater detail, the invention will now be described in conjunction with the accompanying drawings.

Figure 1:
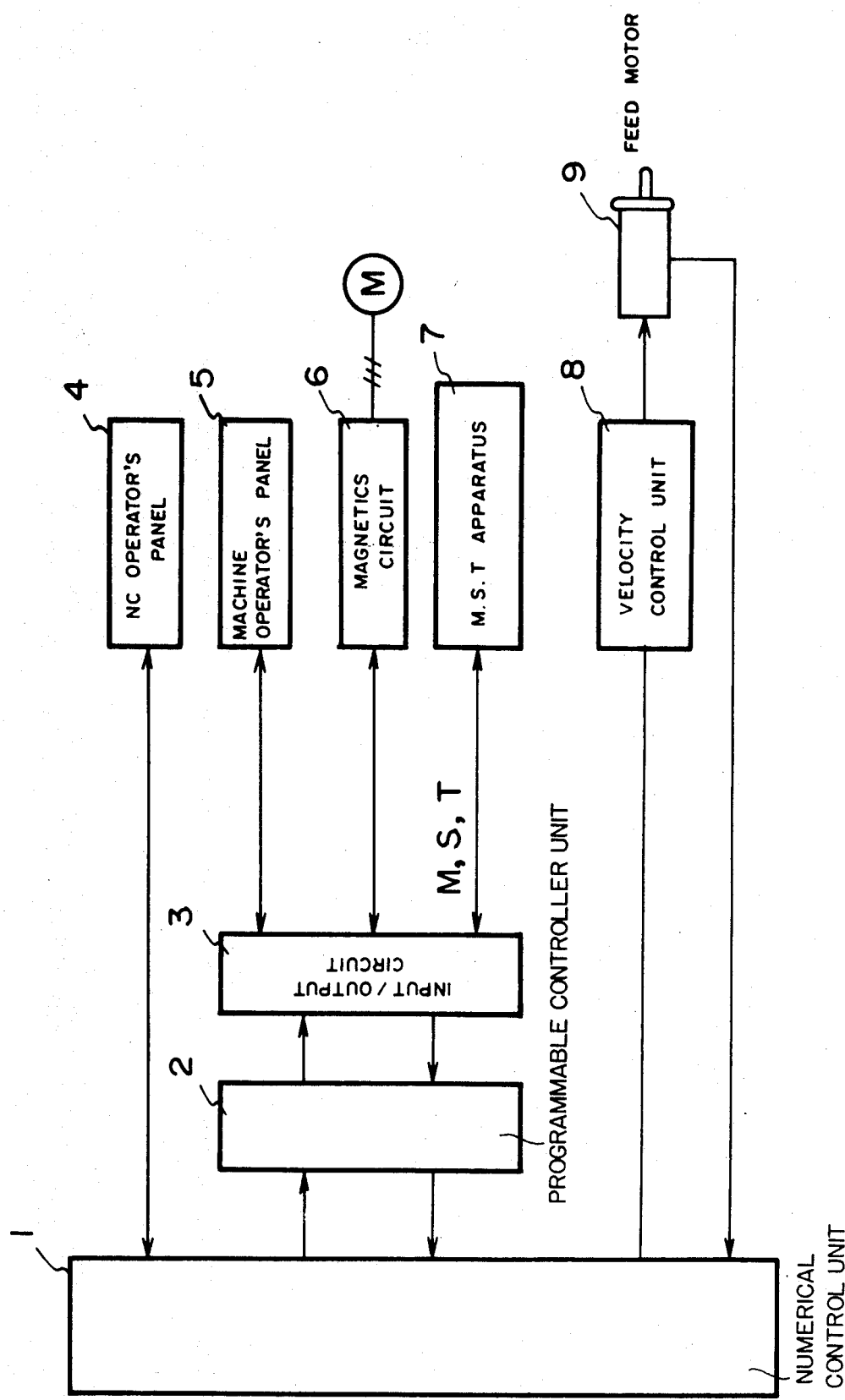
FIG. 1 is a block diagram of a numerical control system for practicing the numerical control method of the present invention.
Figure 2:
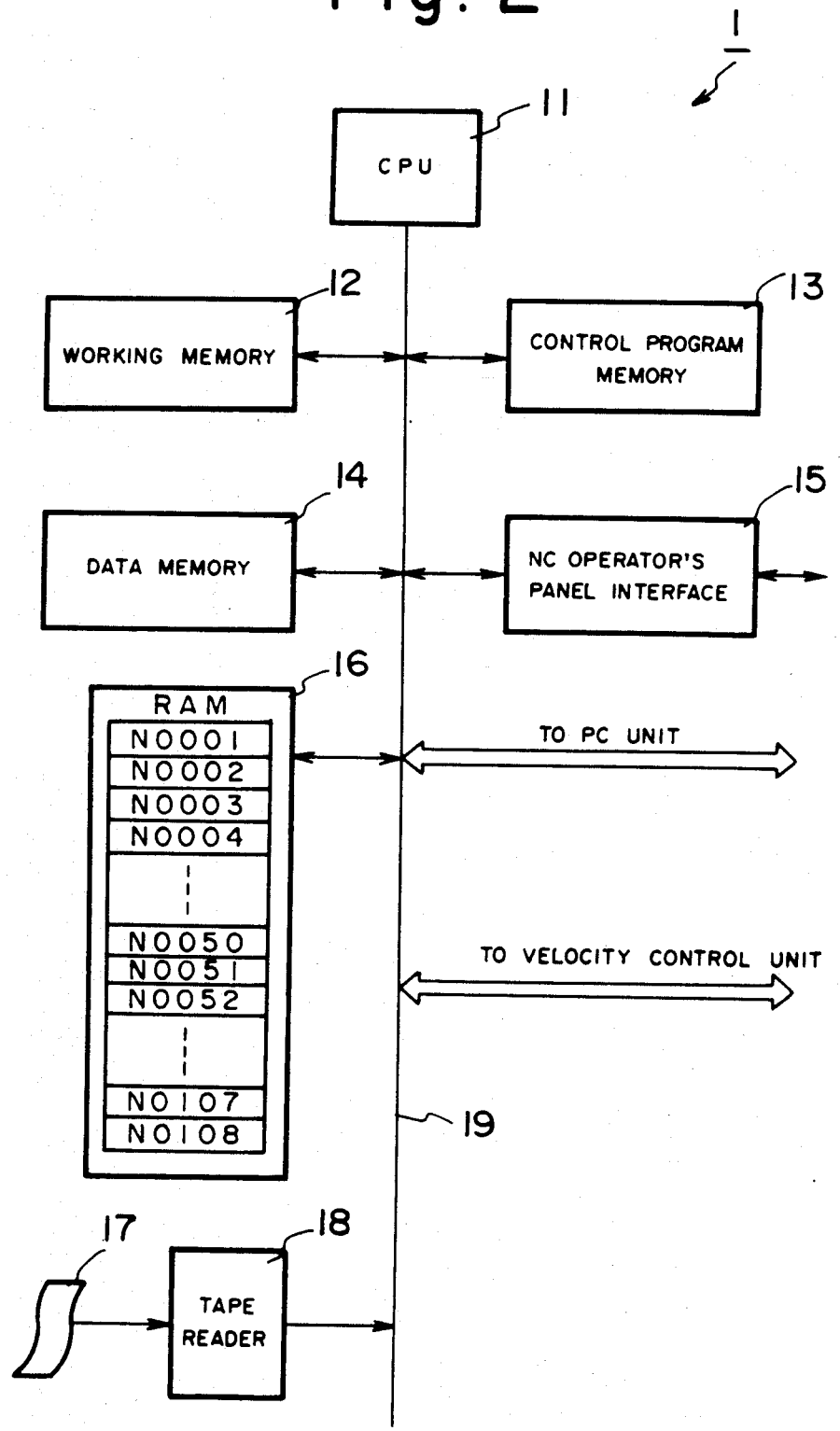
FIG. 2 is a block diagram of a numerical control unit illustrated in FIG. 1.

FIG. 1 is a block diagram of a numerical control system for practicing the numerical control method of the present invention. In the Figure, numeral 1 denotes a numerical control (NC) unit, which will now be described in detail with reference to FIG. 2. The NC unit 1 is composed of a central processor (CPU) 11 for executing processing on the basis of a machining command program, mentioned below, or a control program, a working memory 12, a control memory 13 for storing the control program, a data memory 14, a random-access memory (RAM) 16 for storing machining command data read in via a tape reader 18 from a tape 17 bearing punched machining commands, an interface 15 connected to an NC operator's panel 4, mentioned below, and a data bus 19 interconnecting the foregoing units.

Returning to FIG. 1, numeral 2 denotes a programmable controller unit (PC) of a construction similar to that of a microcomputer and having a memory for storing a sequence program, a processor for executing processing based on the sequence program stored in the memory, and a memory for storing various data. The programmable controller unit 2 performs an exchange of control signals with the NC unit 1 and executes sequence control in accordance with commands from the NC unit 1.

Numeral 3 denotes an input/output circuit connected to the PC unit 2 and to a machine operator's panel 5, a magnetics circuit 6, and an apparatus 7 for an auxiliary (M) function, a spindle speed (S) function, and a tool (T) function.

Numeral 8 denotes a velocity control unit for executing control based on a velocity command from the NC unit 1 in such a manner that the velocity of a feed motor 9 follows the commanded velocity.

Figure 3:
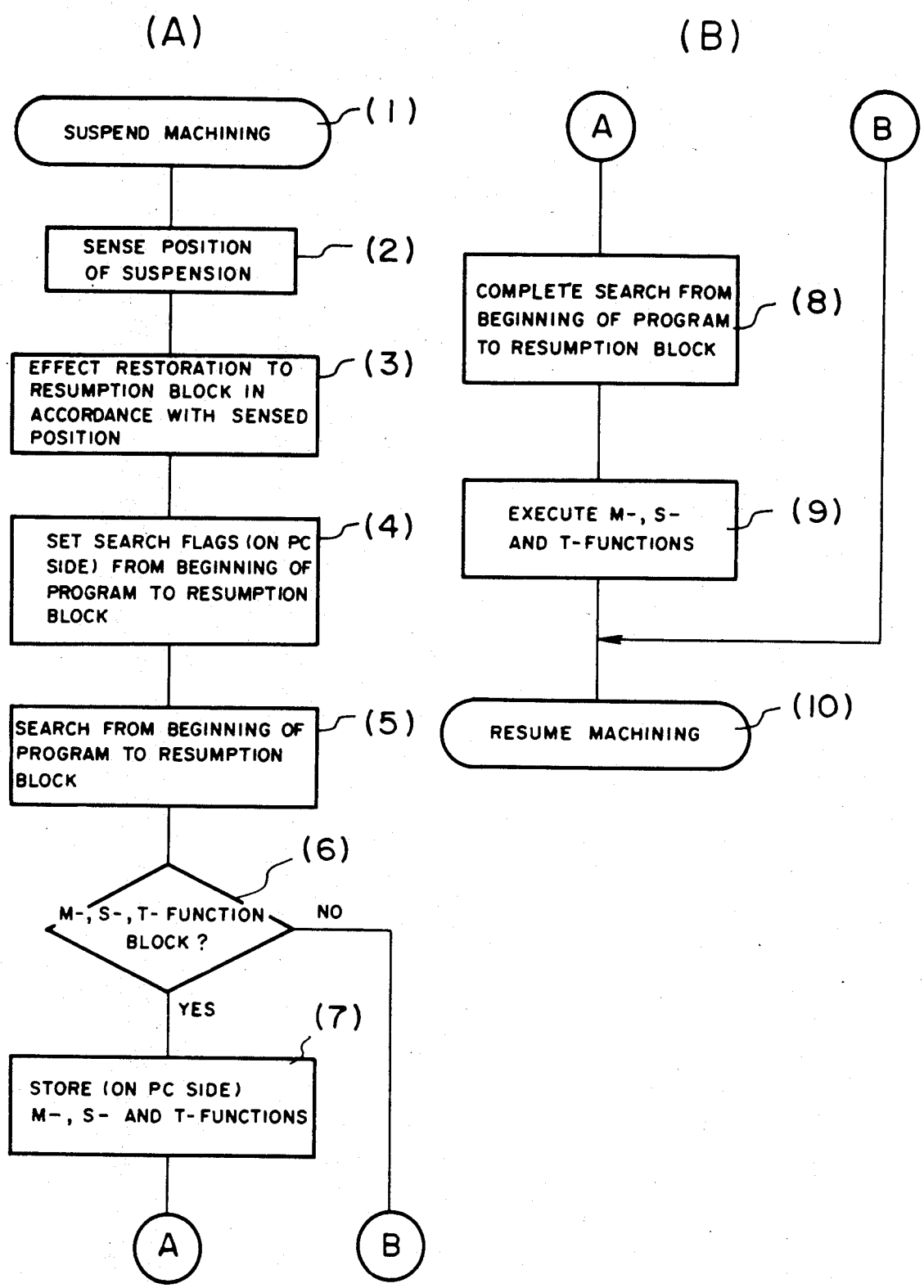
FIG. 3 is a flowchart illustrating the general features of the numerical control method according to the present invention.

A control method for resuming machining after machining is suspended in the foregoing numerical control system will now be described in conjunction with the flowchart of FIG. 3.

(1) First, when a tool breaks or a power failure occurs during the machining of a workpiece, the NC unit 1 senses the event, suspends the machining of the workpiece and, by way of example, causes a display unit provided on the NC operators' panel 4 to display the fact that an accident has occurred, or issues a warning by means of an alarm (step 1).

(2) The position at which machining is suspended is sensed. This generally is performed by the operator. The operator observes the position indication and records the coordinates of the position at which operation stopped (step 2).

(3) Next, by using the operator's panel 4, the operator indicates the appropriate program block position for resuming machining in accordance with the sensed position, whereupon the NC unit 1 restores the workpiece and/or tool to this resumption block position (step 3). In this case, the block position to which restoration is made is determined in the following manner, with reference being had to the program stored in the RAM 16 of FIG. 2, by way of example. In a case such as one in which machining of the workpiece is suspended at a block having program number N0052, the operator restores the machining status of the workpiece to program number N0051 or N0050 upon first examining a program list displayed on the display unit of the NC operator's panel 4. That is, once the position at which machining of the workpiece has been suspended is sensed, restoration is made to the optimum position, which depends upon the status that prevails.

(4) Next, on the basis of the block indicated as suitable for resumption of machining, the NC unit 1 sets up search flags from the beginning of the machining program to the block at which machining is to be resumed (step 4).

(5) The NC unit 1 sends a search status signal to the PC unit 2 from the beginning of the machining program to the block at which machining is to be resumed, the search flags having been set up in step (4), and causes the PC unit 2 to execute a search of the machining program (step 5). When a move command is encountered in the searching of the machining program, the commanded distribution is not performed on the machine side, but coordinate system setting solely for updating position, an auxiliary (M) function, spindle speed (S) function and tool (T) function are executed. Dwell, however, is neglected. When an M-, S- or T-function block is encountered in the searching of the machining program (step 6), the NC unit 1 sequentially stores these data in the memory of the PC unit 2 to update the memory (step 7). However, the PC unit 2 does not send M-, S- and T-function commands to the machine side when the search of the machining program is being executed.

(6) When the search from the beginning of the machining program to the machining resumption block is completed (step 8), namely in response to an OFF signal during the search, the NC unit 1 causes the PC unit 2 to execute the stored M-, S- and T-functions (step 9). In this way the M-, S- and T-functions can be set to conditions the same as those that prevailed when the program was run in the ordinary manner.

(7) Next, the NC unit executes numerical control on the basis of the machining program starting from the machining resumption block, thereby to resuming machining of the workpiece (step 10). From this point onward, the numerical control system continues ordinary operation.

In step 3, it is permissible for the program block position suitable for resuming machining to be located several blocks before the machining suspension position or at the machining suspension position.

Though the present invention has been described based on the illustrated embodiment, the invention is not limited to the illustrated embodiment but can be modified in various ways without departing from the scope of the claims.

As set forth above, the present invention allows machining to be resumed automatically under conditions exactly the same as those that prevailed when the machining program was run from the beginning, even in a case where machining is resumed from any block of the machining program. Accordingly, the present invention is particularly useful when used in a numerical control system of a machine tool capable of performing sophisticated machining.

We claim:

1. A numerical control method in a numerical control system having a numerical control unit for executing numerical control of a machine on the basis of a machining program, and a programmable controller unit for executing sequence control of a machine tool on the basis of a control signal from said numerical control unit, the method comprising the following steps:
   (a) returning the machining program to the beginning of the machining program when automatic operation of the numerical control unit is suspended;
   (b) running the machining program up to a position necessary for resuming machining, step (b) being executed by the numerical control unit after step (a);
   (c) operating the programmable controller unit based on data transmitted by the numerical control unit without the programmable controller unit outputting signals to the machining tool, step (c) being executed while step (b) is being executed; and
   (d) resuming machining after the numerical control unit runs the machining program up to the position necessary for resuming machining.

2. A numerical control method according to claim 1, wherein the position of the machining program necessary for resuming machining is a data block which prevailed when machining was suspended.

3. A numerical control method according to claim 1, wherein the position of the machining program necessary for resuming machining is a data block prior to a data block which prevailed when machining was suspended.

4. A numerical control method according to claim 1, wherein step (c) reestablishes machining control conditions to the machining control conditions at the suspension of operation.

* * * * *